United States Patent
Bates et al.

(10) Patent No.: US 6,295,613 B1
(45) Date of Patent: Sep. 25, 2001

(54) DEBUG WATCH MECHANISM AND METHOD FOR DEBUGGING A COMPUTER PROGRAM

(75) Inventors: Cary Lee Bates; Paul Reuben Day, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/067,463

(22) Filed: Apr. 28, 1998

(51) Int. Cl.$^7$ ...................................... G01R 31/28
(52) U.S. Cl. .................. 714/43; 714/38; 714/48; 714/47; 714/15; 714/16; 712/227; 706/46; 705/1; 713/38; 713/207
(58) Field of Search .................. 714/39, 49, 54, 714/50, 51, 227

(56) References Cited

U.S. PATENT DOCUMENTS

| | | | |
|---|---|---|---|
| 5,119,377 | * | 6/1992 | Cobb et al. .......................... 371/19 |
| 5,319,645 | * | 6/1994 | Bassi et al. .......................... 371/19 |
| 5,526,485 | * | 6/1996 | Brodsky ......................... 395/183.14 |
| 5,590,329 | * | 12/1996 | Goodnow et al. .................... 395/708 |
| 5,608,644 | * | 3/1997 | DeBacker ............................. 364/481 |
| 5,608,867 | * | 3/1997 | Ishihara ........................... 395/184.01 |
| 5,784,552 | * | 7/1998 | Bishop et al. .................. 395/183.14 |
| 6,028,999 | * | 2/2000 | Pazel .................................... 395/704 |
| 6,094,729 | * | 7/2000 | Mann ..................................... 714/25 |

\* cited by examiner

Primary Examiner—Ayaz Sheikh
Assistant Examiner—Firmin Backer
(74) Attorney, Agent, or Firm—Martin & Associates LLP

(57) ABSTRACT

A watch signature for a debug watch mechanism indicates one or more allowable events, which represent allowable accesses to a watched variable. The allowed accesses implicitly include thread information by limiting the allowable operations to a single thread that first performs an allowed operation. Any operations on the watched variable that are caused by a different thread, and any operations that are caused by the same thread other than those specified in the watch signature will create a notification that an unauthorized operation on the watched variable has occurred. The debug watch mechanism of the present invention thus does not notify the user for expected operations on the variable, but provides notification for other events that do not fall within the anticipated behavior of the computer program as specified by the watch signature.

20 Claims, 5 Drawing Sheets

```
1   foo()
2   {
3       p(semaphore_for_j);
4
5       y = j;
6       f();
7       x = j + k;
8       j = x / y;
9
10      v(semaphore_for_j);
11  }
```

FIG. 4

```
1   foo()
2   {
3       p(semaphore_for_j);
4
5       y = j;      ◄——— 510
6       f();
7       x = j + k;
8       j = x / y;  ◄——— 520
9
10      v(semaphore_for_j);
11  }
```

FIG. 5

```
1   foo()
2   {
3       p(semaphore_for_j);
4
5       y = j;       ← 610
6       f();
7       x = j + k;   ← 620
8       j = x / y;   ← 630
9
10      v(semaphore_for_j);
11  }
```

WATCH(j:5:Read, j:7:Read, j:8:Write)

DEBUG WATCH MECHANISM AND METHOD FOR DEBUGGING A COMPUTER PROGRAM

BACKGROUND OF THE INVENTION

1. Technical Field

This invention generally relates to computer programming and more specifically relates to a mechanism and method for debugging a computer program.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or bugs, during the development of a computer program. One way of debugging a computer program is to configure a "watch function" for a variable in the computer program. Borland, a well-known software company, defines one type of watch function that returns the value for a specified variable to display to a user at any stop point. A watch in this context will simply display to the user the variable value each time the program is stopped. Thus, if a programmer is executing one instruction at a time to single-step through the execution of a computer program, the watch function makes the value of the watched variable available to the programmer when the execution is stopped after each instruction.

A different watch finction is also known in the art that allows a user to specify a watched variable, and any change to the variable will cause the execution of the computer program to halt. However, it is not very useful to have the program halt on each and every change to a variable when a variable may be legally changed thousands or millions of times. Trying to isolate a single change due to a bug from a vast number of expected changes is nearly impossible using this prior art watch. Furthermore, these prior art watch functions cannot distinguish between different threads in a multi-process environment.

Many modern computer systems provide a multi-process environment, which allows the computer system to execute multiple processes in parallel. One specific type of computer system that is capable of executing multiple processes is known as a multi-threaded computer system. In a multi-threaded computer system, multiple threads of control are available to the operating system. The operating system assigns different threads to different processes. Modern debugging tools generally do not have a way to distinguish operations on variables by a particular thread from operations on those variables by a different thread.

Without a mechanism for distinguishing operations on a variables by one thread from another during the debugging of a computer program, certain bugs will remain very difficult to detect, resulting in the release of computer software to the public that contains bugs. Buggy software can cost software developers millions of dollars to correct, and can dilute the goodwill of the company in the eyes of the purchaser.

DISCLOSURE OF INVENTION

According to the present invention, a watch signature for a debug watch mechanism is defined that indicates one or more allowable events, which represent allowable accesses to a watched variable. The allowed accesses implicitly include thread information by limiting the allowable operations to a single thread that first performs an allowed operation. Any operations on the watched variable that are caused by a different thread, and any operations that are caused by the same thread other than those specified in the watch signature will create a notification that an unauthorized operation on the watched variable has occurred. The debug watch mechanism of the present invention thus does not notify the user for expected operations on the variable, but provides notification for other events that do not fall within the anticipated behavior of the computer program as specified by the watch signature.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 4 is a diagram showing a sample portion of code for illustrating the operation of the debug watch mechanism and associated method;

FIG. 5 is a diagram showing the designation of a range in the code of FIG. 4 for the debug watch mechanism of FIG. 1;

BEST MODE FOR CARRYING OUT THE INVENTION

Figure 1:
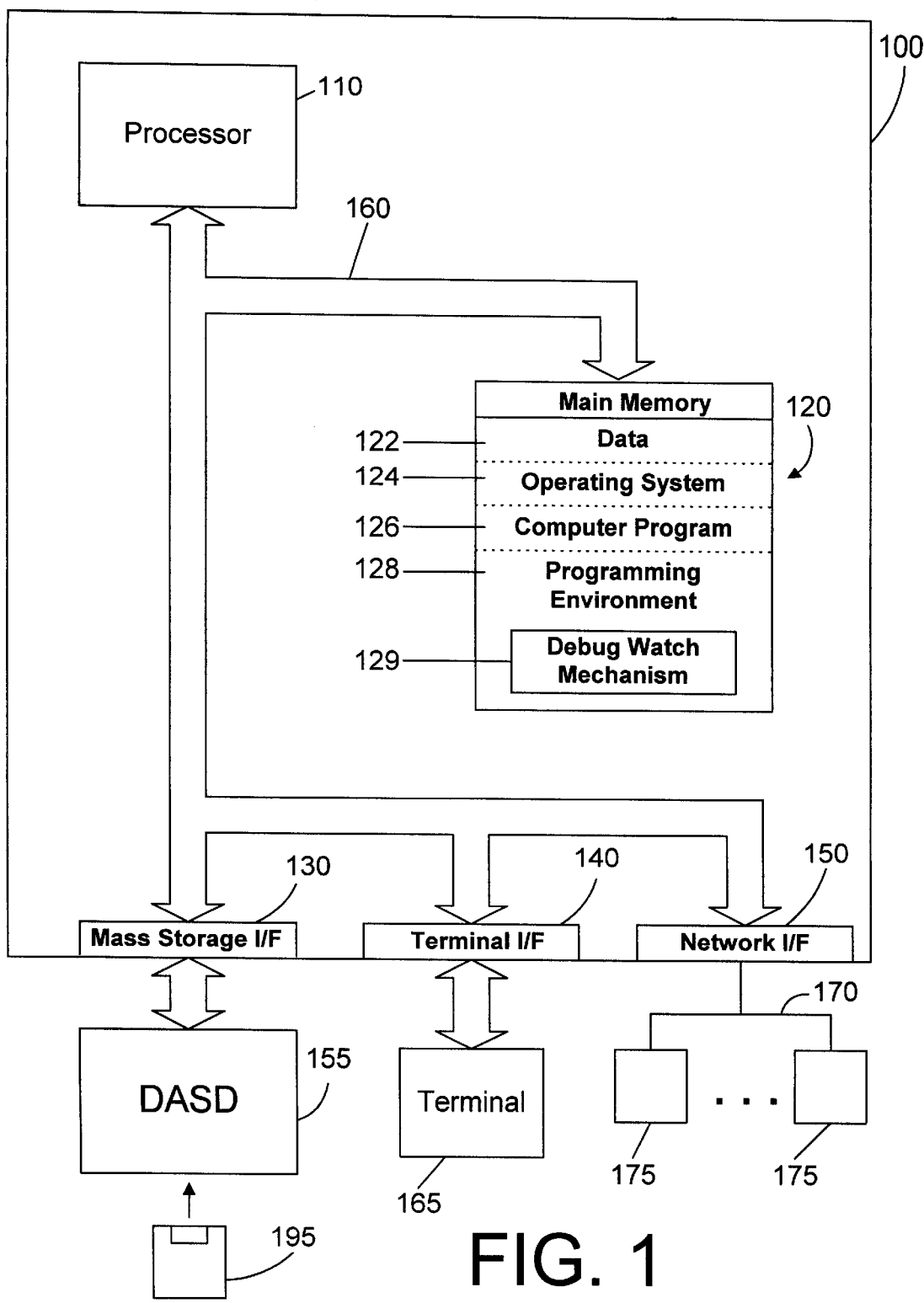
FIG. 1 is a block diagram of an apparatus in accordance with a preferred embodiment of the present invention.

The present invention is used in a programming environment for developing computer programs. For those who are not familiar with software development techniques, the brief overview below provides background information that will help the reader to understand the present invention.

1. Overview

Modern Programming Environments

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler", as used within this specification, generically refers to any mechanism that transforms one representation of a computer program into another representation of that program.

This machine readable form, within this specification, is a stream of binary instructions (i.e., ones and zeros) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Once the machine-readable instructions have been generated, the computer program may be run on the computer system it was designed for.

Computer programs typically include one or more program variables that contain data of interest. These variables are typically represented by text labels in high-level and intermediate code computer programs. The concept of program variables is well known in the art.

Modern programming environments may provide many different combinations of features. For exanple, most programming environments include an editor or browser that displays source code to the programmer on a display device. A compiler is used, as explained above, to generate machine code from source code. A linker may also be included to allow subportions of the program to be separately compiled and linked together after compilation. Some programming environments include target hardware, which is the hardware on which the computer program is intended to run. Others may provide a simulator in software to "run" the code to simulate how the target hardware would respond to the computer program. Most modern programming environments also provide a debugger to help a programmer to locate problems in a computer program.

Debugging a Computer Program

For a computer program of any complexity, the program will likely not perform exactly as intended due to programmer errors, known as "bugs", in the computer program. To help a programmer locate the bugs in his or her program, most modern programming environments provide a debugger that gives the programmer a variety of different tools for locating bugs. For example, a typical debugger includes a breakpoint capability that stops the execution of the program when a specified event occurs. Once the program execution is stopped, the debugger typically allows the programmer to examine memory and status information to determine whether or not the program is in the proper state. Conditional breakpoints are also well-known, which stop execution of the program when a breakpoint is encountered only if certain conditions are met. A debugger may also allow a programmer to specify conditions and run a "program trace", which writes to memory a list of all events of interest to the programmer without stopping the execution of the code. The present invention applies to any mechanism or system for debugging a computer program, whether presently known or developed in the future.

2. Detailed Description

According to a preferred embodiment of the present invention, a debug watch mechanism and apparatus allow a programmer to specify a watch signature for one or more variables, which defines allowable events during the execution of the computer program. The occurrence of any event other than the allowable events generates a notification to the user, who can then examine the state of the computer system to determine why the unexpected event occurred. This capability is especially useful in multi-threaded environments, where allowable events may be constrained to be performed by a single thread, thus providing notification if a different thread performs an unexpected event.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a computer program 126, and a programming environment 128 that includes a debug watch mechanism 129 in accordance with the preferred embodiments. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, computer program 126, programming environment 128, and debug watch mechanism 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Computer program 126 represents a computer program in any form, whether source code, intermediate language, machine code, or other forms. Computer program 126 may include system programs (e.g., an operating system), application programs, or any other types and forms of computer programs.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of computer program 126 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
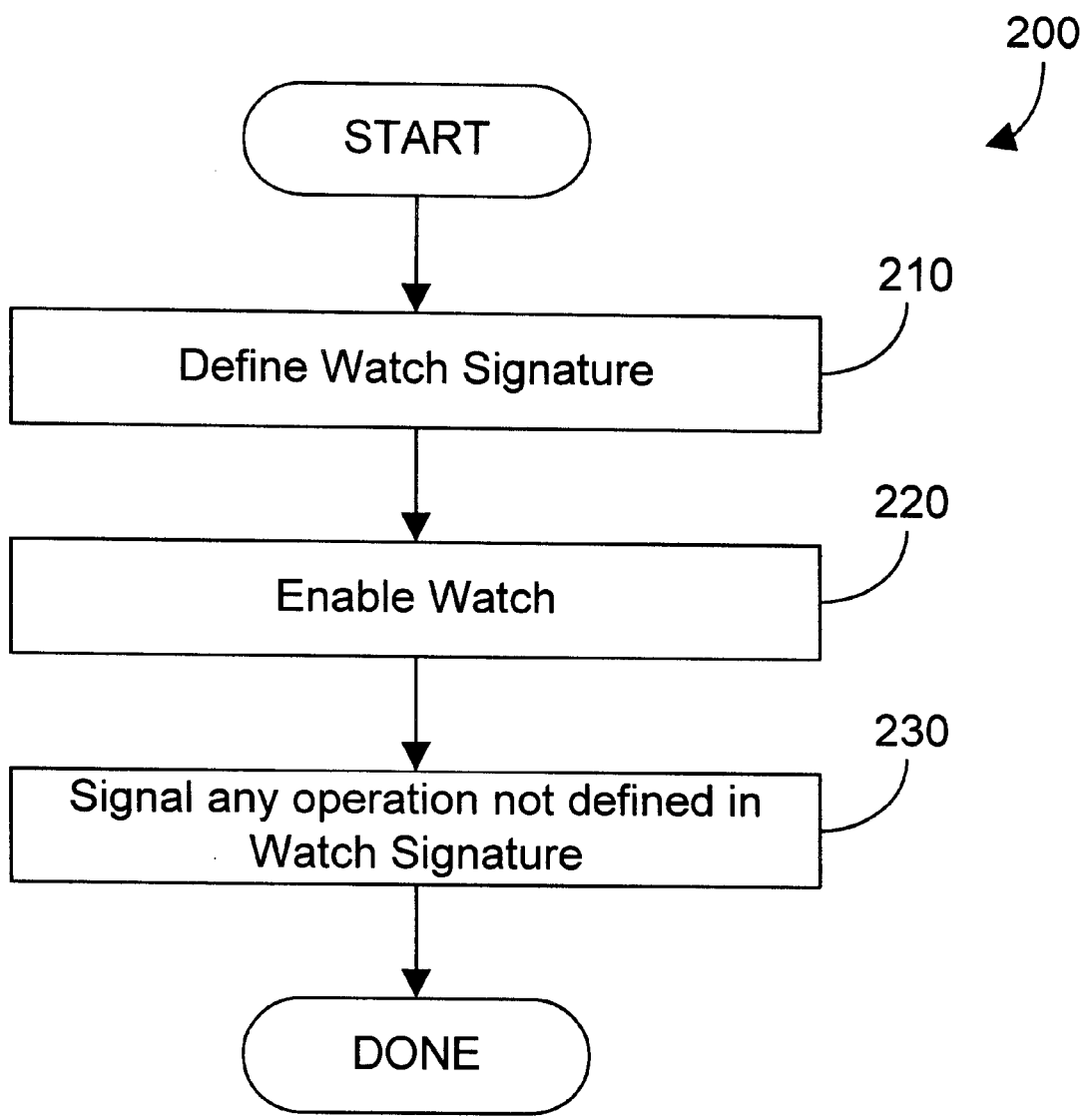
FIG. 2 is a flow diagram of a debug method in accordance with the preferred embodiments.

The remainder of this specification describes the details of debug watch mechanism 129 in FIG. 1. Referring to FIG. 2, debug watch mechanism 129 performs a method 200 in accordance with a preferred embodiment. Method 200 begins by defining a watch signature (step 210). Next, the watch is enabled (step 220). Finally, any operation that is not specified in the watch signature will generate a notification (step 230). Method 200 thus allows a programmer to specify allowable events in the watch signature (step 210), and once the watch is enabled (step 220), any operation that is not specified in the watch signature generates a notification (step 230).

Method 200 is significant in allowing a programmer to define a watch signature of expected or "allowable") events. This concept of excluding allowable events from generating a notification is especially useful in a multi-threaded programming environment. Referring to FIG. 4, a function foo( ) is defined that has a semaphore for variable j that is called semaphore_for_j. This semaphore is set at the beginning of foo in line 3 by the p(semaphore_for_j) instruction and is reset at the end in line 10 by the v(semaphore_for_j) instruction. Thus, when the program operates correctly, nothing should corrupt the value of j during the execution of foo( ). If another thread attempts to access j, it should first look at semaphore_for_j to determine whether j may be accessed, and only access j if the semaphore_for_j is not set. However, in a computer program that is being developed and debugged, it is possible for a different thread to inadvertently operate on j by performing a read or a write without checking the semaphore. This type of bug is very difficult to track down because it may only happen rarely compared to the allowable operations on j. If the computer program were to stop for each operation on j, there may be thousands or even millions of allowable operations on j before an unallowable operation occurs. By excluding notifications for allowable operations, only the unexpected operations on j will generate a notification. In this manner, an unauthorized operation by another thread may be easily isolated and examined so that the bug that caused the operation may be fixed.

An allowable event is an event that is expected to occur. Specifying multiple allowable events within a span of code that should not be operated on by other threads will result in the allowable events being limited to a particular thread. Thus, two different types of events will cause a notification to occur: 1) operations by the same thread that are not specified in the watch signature, and 2) any operation by a different thread.

Step 210 of defining the watch signature is the step a programmer generally takes to enable the watch for a defined range of instructions. This range may be explicitly defined as a range with a beginning instruction and an end instruction, and may include all instructions in between. In the alternative, the user may select multiple instructions that are allowable operations on a program variable, and the "range" of instructions will be spanned by the first selected instruction and will end with the last selected instruction. Once the watch is enabled, it is activated when the first instruction in the range is executed. The watch is deactivated when the last instruction in the range is executed. Only non-allowable operations that occur when the watch is activated are reported by the watch.

Figure 3:
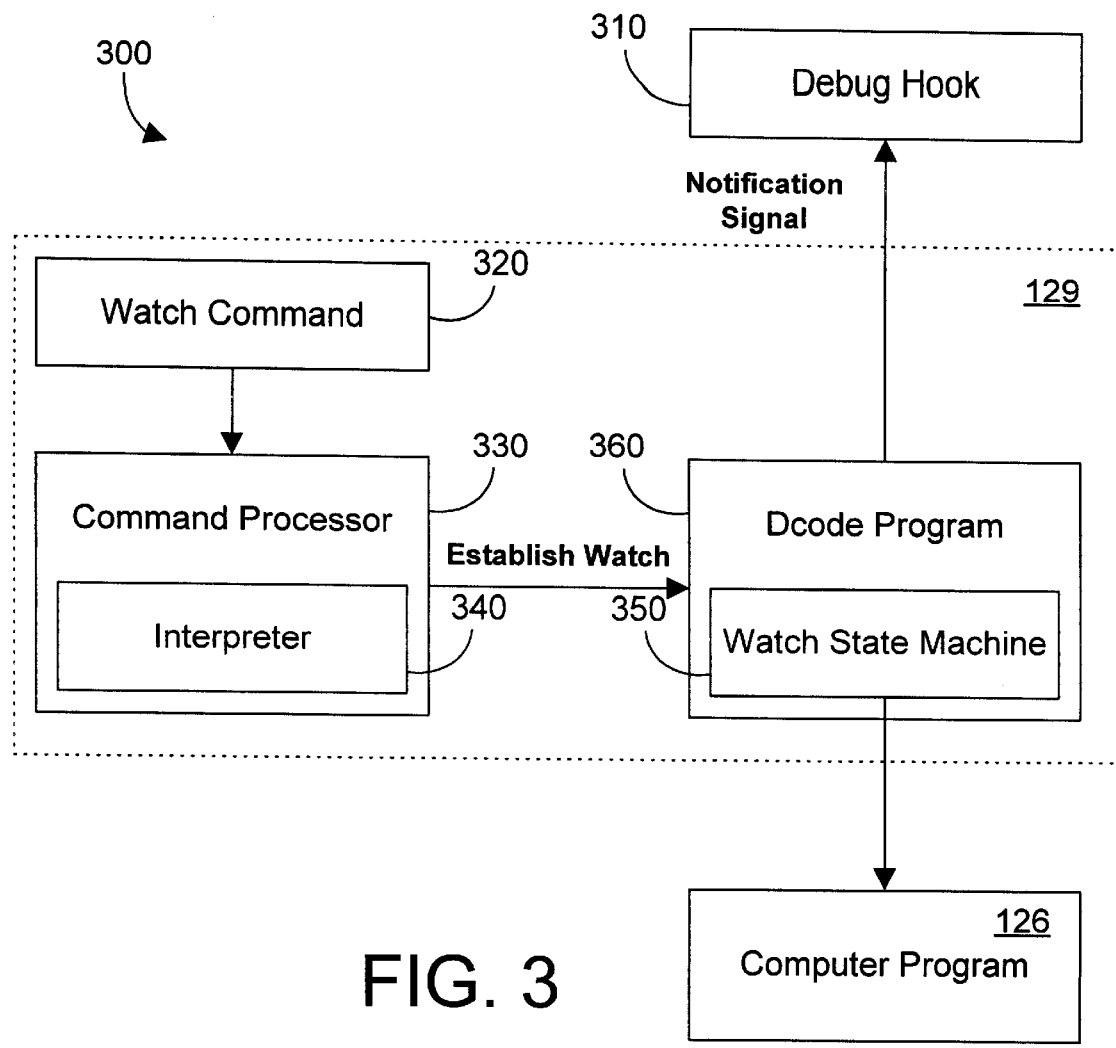
FIG. 3 is a block diagram showing the debug watch mechanism 129 according to a preferred embodiment.

Referring to FIG. 3, a debug watch mechanism 129 in accordance with the best mode of the invention includes a watch command 320, a command processor 330 with an interpreter 340, and a Dcode program 360 with a watch state machine 350. Watch command 320 specifies the watch signature, which is the allowable events for one or more program variables. Dcode program 360 is low-level debugging code that is similar to the Pcode program that is well-known in early implementations of the Pascal programming language. Dcode program 360 provides notifications according to watch command 320. Command processor 330 and interpreter 340 establish the watch from the watch command 320 by specifying the allowable events to the watch state machine 350. Once the watch state machine 350 is configured, it monitors the execution of computer program 126. Watch state machine 350 detects any operation on any variable specified in the watch command 320 by monitoring low-level hardware traps for all operations on program variables specified in the watch signature. Watch state machine 350 then filters out all allowable events so that only events not specified in the watch command 320 generate a notification signal. When a non-allowable event occurs, Dcode program 360 generates a notification signal to a debug hook 310. Debug hook 310is a programming interface to the normal debug finctions that allow a programmer to view contents of registers, memory, status, etc. Thus, by calling debug hook 310, Dcode program 360 causes the execution of computer program 126 to stop, and the programmer can then investigate to determine what caused the unauthorized operation in the specified program variable(s).

Many different methods exist for specifying allowable events in a watch signature. Some of these are shown by way of example in FIGS. 5–7. A user may specify a watch signature by selecting a variable in the program, then selecting a range of instructions for that variable. For the example in FIG. 5, we assume that variablej is selected. The range of instructions may be specified in a number of different ways. For example, referring to FIG. 5, a programmer using a graphical user interface could position a mouse pointer on line 5 and click, creating a pointer 510 that begins a range for the specified variable. In similar fashion, the programmer could position a mouse pointer on line 8 and click, creating a pointer 520 that ends the range for the specified variable. Note that the range could be selected first, with the variable being specified after the range is defined. With such a range defined, debug watch mechanism 129 could signal any operation on j in that range by another thread. In addition, debug watch mechanism 129 could signal any operation on j made by the same thread that is not expected. For example, once a range is defined, debug watch mechanism 129 can scan the instructions in the range to dynamically determine all allowable events in the range. Defining ranges of allowable operations requires that Dcode program 360 set a breakpoint at the beginning and end of the range, and use the breakpoint events to configure watch state machine 350 to appropriately filter the low-level hardware traps.

Figures 6, 7:
FIG. 6 is a diagram showing the designation of allowable events in the code of FIG. 4 for the debug watch mechanism of FIG. 1.
FIG. 7 is a diagram showing a command line for enabling the debug watch mechanism of FIG. 1.

Referring to FIG. 6, an alternative implementation allows the programmer to select multiple allowable events, with the first and last inherently defining a range of allowable events. We assume again that variable j is selected. A programmer selects the instructions on lines 5, 7 and 8 by clicking on these instructions with a mouse. This causes pointers 610, 620 and 630 to be set to identify the allowable events, which enables the watch. With the watch enabled, the execution of the instruction at line 5 activates the watch, and any operation on j by another thread between lines 5 and 8, or any operation on j by the same thread that is not specified by the allowable events (such as an operation on j during the f( ) fimction call) will cause a notification to be issued. Note that specifying multiple allowable events inherently specifies that these events will occur in the expected order. If, for example, j is read in line 5, and is written in line 8 without being read in line 7, this will also be a non-allowable event that will trigger a notification. The watch is deactivated once the instruction in line 8 is executed.

Of course, there are numerous other ways to specify a watch signature for debug watch mechanism 129. Referring to FIG. 7, a special debug instruction could enable the watch with an appropriate watch signature. The statement of FIG. 7 provides some of the same information as the pointers 610, 620 and 630 in FIG. 6. The watch statement of FIG. 7 includes: the variable of interest, the line number, and whether the expected operation is a read or a write. While the example watch statement in FIG. 7 specifies allowable events for a single variable j, it is equally within the scope of the preferred embodiments to specify multiple variables in the watch signature.

Note that the order of operations within an instruction may be indeterminate. For example, in line 7, if the read of j and the read of k were both specified in the watch signature, the signature itself would imply an order unless told to do otherwise. If the read from j at line 5 was specified before the read from k, this order would be enforced. However, operators within a watch statement could easily account for indeterminate ordering. One way to do this is to enclose indeterminate orderings within square brackets. Thus a statement of the form WATCH(j:5:Read, [j:7:Read, k:7:Read], j:8:Write) would allow the read from j and the read from k in line 7 to occur in any order, but would still require that both occur.

Another variation to the watch signature within the scope of the present invention allows special operators such as boolean operators within the watch signature. Boolean operators allow logical relationships that are expected during the execution of the computer program. For example, an allowable event may be the reading of one variable OR another variable. While numerous other variations and extensions of the watch signature may be conceived, the present invention in its broadest sense expressly encompasses any and all ways of specifying one or more allowable event or combinations of allowable events in the watch signature.

Note that writes to program variables are inherently more interesting than reads to program variables because reads cannot corrupt the value of the variable. However, watching reads may also be useful to determine when a thread is reading a variable when the variable is supposed to be locked by another thread.

One skilled in the art will appreciate that many variations are possible within the scope of the present invention. For example, any suitable means for defining a watch signature is expressly included in the present invention. Some examples have been presented herein for the sake of illustrating the present invention, but many other ways of defining a watch signature are possible, and will be evident to one skilled in the art. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   a computer program residing in the memory; and
   a debug watch mechanism residing in the memory and executed by the at least one processor, the debug watch mechanism operating according to a watch signature that defines at least one allowable operation on at least one program variable in the computer program and providing notification of any operations on the at least one program variable that are not specified in the watch signature.

2. The apparatus of claim 1 wherein the watch signature defines at least one allowable event, each allowable event comprising an expected operation on a program variable during execution of the computer program.

3. The apparatus of claim 1 wherein the debug watch mechanism is enabled by specifying the watch signature for a range of instructions, and wherein the debug watch mechanism becomes active when the first instruction in the range is executed.

4. The apparatus of claim 1 wherein the watch signature defines a plurality of allowable events, each allowable event comprising an expected operation on a program variable during execution of the computer program, and wherein the debug watch mechanism is activated by a first thread perfomiing a first of the plurality of allowable events and is deactivated by the first thread performing a last of the plurality of allowable events, the debug watch mechanism providing the notification while the debug watch mechanism is activated for:

any operations by the first thread that are not specified in the watch signature; and any operations made by a second thread on the at least one program variable.

5. An apparatus comprising:

a computer program residing in a memory;

a debug watch mechanism residing in the memory;

means for enabling the debug watch mechanism by specifying a watch signature that defines at least one allowable operation on at least one program variable in the computer program;

means for activating the debug watch mechanism when a first instruction is executed;

the debug watch mechanism providing notification of any operations on the at least one program variable that are not specified in the watch signature while the debug watch signature is activated.

6. The apparatus of claim 5 further comprising a watch signature for the debug watch mechanism, the watch signature defining at least one allowable event, each allowable event comprising an expected operation on a program variable during execution of the computer program.

7. A method for debugging a computer program comprising the steps of:

defining a watch signature that defines at least one allowable operation on at least one program variable in the computer program; and providing notification of any operations on the at least one program variable that are not specified in the watch signature.

8. The method of claim 7 wherein the watch signature defines at least one allowable event, each allowable event comprising an expected operation on a program variable during execution of the computer program.

9. The method of claim 7 further comprising the steps of:

enabling a watch in accordance with the watch signature for a range of instructions; and activating the watch when a thread executes the first instruction in the range.

10. The method of claim 7 wherein the watch signature defines a plurality of allowable events, each allowable event comprising an expected operation on a program variable during execution of the computer program, the method further comprising the steps of:

activating a watch by a first thread performing a first of the plurality of allowable events;

deactivated the watch by the first thread performing a last of the plurality of allowable events;

providing the notification while the watch is activated for:
any operations by the first thread that are not specified in the watch signature; and
any operations by a second thread on the at least one program variable.

11. A method for debugging a computer program that is executed by multiple threads, the method comprising the steps of:

defining a watch signature for at least one program variable in the computer program, the watch signature defining a plurality of allowable events, each allowable event comprising an expected operation on a program variable during execution of the computer program;

enabling a watch in accordance with the watch signature for a range of instructions defined by the plurality of allowable events;

activating the watch when a first thread executes the first instruction in the range;

deactivated the watch by the first thread performing a last of the plurality of allowable events;

providing the notification while the watch is activated for:
any operations by the first thread that are not specified in the watch signature; and
any operations by a second thread on the at least one program variable.

12. A program product comprising:

a debug watch mechanism that operates according to a watch signature that defines at least one allowable operation on at least one program variable in a computer program and provides notification of any operations on the at least one program variable that are not specified in the watch signature; and signal bearing media bearing the debug watch mechanism.

13. The program product of claim 12 wherein the signal bearing media comprises recordable media.

14. The program product of claim 12 wherein the signal bearing media comprises transmission media.

15. The program product of claim 12 wherein the watch signature defines at least one allowable event, each allowable event comprising an expected operation on a program variable during execution of the computer program.

16. The program product of claim 12 wherein the debug watch mechanism is enabled by specifying the watch signature for a range of instructions, and wherein the debug watch mechanism becomes active when a thread executes the first instruction in the range.

17. The program product of claim 12 wherein the watch signature defines a plurality of allowable events, each allowable event comprising an expected operation on a program variable during execution of the computer program, and wherein the debug watch mechanism is activated by a first thread performing a first of the plurality of allowable events and is deactivated by the first thread performing a last of the plurality of allowable events, the debug watch mechanism providing the notification while the debug watch mechanism is activated for:

any operations by the first thread that are not specified in the watch signature; and any operations by a second thread on the at least one program variable.

18. A program product comprising:

(A) a debug watch mechanism that operates according to a watch signature for at least one program variable in a computer program and provides notification of any operations on the at least one program variable that are not specified in the watch signature, the watch signature defining a plurality of allowable events, each allowable event comprising an expected operation on a program variable during execution of the computer program, the debug watch mechanism being enabled by specifying the watch signature for a range of instructions, and wherein the debug watch mechanism becomes active when a thread executes the first instruction in the range, wherein the watch signature defines a plurality of allowable events, and wherein the debug watch mechanism is activated by a first thread performing a first of the plurality of allowable events and is deactivated by the first thread performing a last of the plurality of allowable events, the debug watch mechanism providing the notification while the debug watch mechanism is activated for:

(1) any operations by the first thread that are not specified in the watch signature; and (2) any operations by a second thread on the at least one program variable; and (B) signal bearing media bearing the debug watch mechanism.

19. The program product of claim 18 wherein the signal bearing media comprises recordable media.

20. The program product of claim 18 wherein the signal bearing media comprises transmission media.

* * * * *